United States Patent [19]

Graiver et al.

[11] Patent Number: 4,547,312

[45] Date of Patent: Oct. 15, 1985

[54] ELECTRICALLY CONDUCTIVE ELASTOMERS FROM EMULSIONS

[75] Inventors: Daniel Graiver, Midland; Robert E. Kalinowski, Auburn, both of Mich.

[73] Assignee: Dow Corning Corporation, Midland, Mich.

[21] Appl. No.: 645,985

[22] Filed: Aug. 31, 1984

[51] Int. Cl.$^4$ ............................................... H01B 1/06
[52] U.S. Cl. .................................... 252/513; 252/514; 252/512; 523/137
[58] Field of Search ............... 252/511, 512, 513, 514, 252/502, 503; 523/137; 524/439, 401, 435, 440

[56] References Cited

U.S. PATENT DOCUMENTS

| | | | |
|---|---|---|---|
| 3,583,930 | 6/1971 | Ehrreich et al. | 252/514 |
| 3,706,695 | 12/1972 | Huebner et al. | 117/226 |
| 4,011,360 | 3/1977 | Walsh | 428/402 |
| 4,221,688 | 9/1980 | Johnson et al. | 524/251 |
| 4,244,849 | 1/1981 | Saam | 524/442 |

OTHER PUBLICATIONS

"Silver-Coated Glass Spheres," Potters Industries, Inc.

*Primary Examiner*—Josephine L. Barr
*Attorney, Agent, or Firm*—Edward C. Elliott

[57] ABSTRACT

A composition which provides an elastomeric, electrically conductive product upon removal of the water at ambient conditions is described. The composition comprises an emulsion (A) having a dispersed phase of elastomer and a continuous phase of water containing a material selected from the group comprising colloidal silica, alkali metal silicates, and organosilicates, and (B) electrically conductive, metal coated spheres having a diameter of from 5 to 105 micrometers. Because the dispersed particles of elastomer are crosslinked before the metal coated spheres are added, when the water is removed from the emulsion, the metal coated spheres and the dispersed crosslinked elastomer are found in a continuous polar phase. The cured elastomer, having a surface resistivity of less than 2 ohms per square on at least one surface is particularly useful in producing an efficient shield for electromagnetic radiation in the radio and television frequencies.

21 Claims, No Drawings

ELECTRICALLY CONDUCTIVE ELASTOMERS FROM EMULSIONS

BACKGROUND OF THE INVENTION

1. Field of the Invention

This invention relates to elastomers formed from aqueous emulsion which are made electrically conductive by the inclusion of metal-coated glass spheres.

2. Background Information

An emulsion which can form an electrically conductive silicone rubber is disclosed by Huebner et al. in U.S. Pat. No. 3,706,695, issued Dec. 19, 1972. They claim the use of from 8 to 35 weight percent of carbon black based upon the combined weight of siloxane and carbon black. Their Example 2 shows volume resistivity of the cured product varying from $2.11 \times 10^5$ ohm-cm using 8.6 weight percent carbon black to $6.39 \times 10^3$ ohm-cm using 30 weight percent carbon black.

U.S. Pat. No. 3,583,930, issued June 8, 1971, to Ehrreich et al. teaches that a plastic mass is made conductive by adding metal powders having a surface area to volume ratio of from 450 to 200,000 square feet/cubic foot. The maximum particle size is 100 mils (2.54 mm) preferably 40 mils (1.0 mm) while the minimum is 0.5 mil (0.013 mm) when a noble metal surface is used. Non-noble metals require a minimum size of about 5 mils. Included in plastic mass is elastomeric silicone resin.

U.S. Pat. No. 4,011,360, issued Mar. 8, 1977, to Walsh discloses the use of 75 to 98 parts by weight of electrically conductive particles in 2 to 25 parts by weight of a room temperature curing silicone rubber to obtain an electrically conductive flexible cured silicone rubber. The particle size may be between 5 micrometers to 10,000 micrometers. The mixtures cure upon exposure to moisture.

SUMMARY OF THE INVENTION

A composition which provides an elastomeric, electrically conductive product upon removal of water at ambient conditions comprises (A) an emulsion having a dispersed phase of elastomer and a continuous phase of water containing a material selected from the group comprising colloidal silica, alkali metal silicates, and organosilicates, and (B) greater than 100 parts by weight of electrically conductive, metal coated spheres having a diameter of from 5 to 105 micrometers. The composition, upon removal of the water, yields an elastic product comprising dispersed particles of elastomer and electrically conductive spheres in a solid polar continuous phase. The cured composition has a surface resistivity of less than 2 ohms per square on at least one surface.

The composition of this invention can be used to coat a substrate to produce an electrically conductive, elastomeric coating which serves as an efficient shield for electromagnetic interferences.

DESCRIPTION OF THE INVENTION

This invention relates to a composition which provides an elastomeric electrically conductive product upon removal of water under ambient conditions comprising (A) an emulsion of a dispersed phase of elastomer, and a continuous phase of water containing a material selected from the group comprising colloidal silica, alkali metal silicates, and organosilicates, said emulsion being an aqueous oil-in-water emulsion, having at least 20 percent by weight water, that cures upon drying at ambient temperature to an elastomeric film, and (B) greater than 100 parts by weight of electrically conductive, metal-coated spheres having a diameter of from 5 to 105 micrometers and less than 20 percent of their total weight as metal, based upon 100 parts by weight of non-volatile material in (A), the composition, upon removal of the water, yielding an elastomeric product having dispersed particles of elastomer and electrically conductive spheres in a solid polar continuous phase, and having a surface resistivity of less than 2 ohms per square on at least one surface.

In our modern society more and more of our machinery is becoming powered or controlled by electric and electronic means. Many of these devices generate electromagnetic interferences which effect other equipment. A common example is the high frequency radiation generated by an electrical spark such as when a switch is turned on or off or by the spark plug in an internal combustion engine. This high frequency radiation is dispersed to the surroundings unless the source is properly shielded. Many other devices such as radios, television sets, and electronic devices such as computers which contain circuits based upon semiconductor chips are severly effected in their operation by such extraneous radiation unless they are properly shielded to prevent such stray radiation from reaching their electronic circuits. Films cast from the emulsion of this invention have been found to be particularly efficient in forming a coating for shielding devices from electromagnetic interferences, when tested over a frequency range of from 0.5 to 1000 megaHertz.

The emulsion, (A), of this invention is an emulsion which contains a dispersed phase of elastomer. The preferred emulsion particles are present in the aqueous, oil-in-water emulsion as particles which have crosslinked while the water is still present. Inter-particle crosslinks occur during the drying or curing of the emulsion upon the removal of the water from the emulsion.

(A) also contains a material, selected from the group comprising colloidal silica, alkali metal silicate, and organosilicate dispersed in the continuous water phase. This material provides reinforcement for the dried elastic product and/or participates in the crosslinking of the elastomer. The exact function of this material is discussed further in the discussion below on different types of preferred crosslinked elastomer useful in this invention.

The electrically conductive metal-coated spheres, (B), of this invention are commercial products. Useful spheres have an average diameter of from 5 to 105 micrometres. The metal-coated spheres are restricted to those having less that 20 percent of their total weight present as metal primarily for reasons of economy. Because the metal-coated spheres are electrically conductive and must remain electrically conductive upon use, the metal used must resist the effects of the environment around it, both in the emulsion and in the final elastic product. If the metal corrodes, or oxidizes to form a non-electrically conductive coating, it is not suitable for use. For this reason, the non-oxidizing metals such as gold, silver, platinum, palladium, and nickel are preferred with silver being preferred most. A base metal with a treatment which prevents corrosion or oxidation so that the metal maintains electrical conductivity is also suitable.

Emulsions as defined in (A) of this invention have been found to be uniquely useful in providing the elastomeric, electrically conductive product of this invention. Because the dispersed elastomer particles of the preferred emulsion are crosslinked before the electrically conductive, metal-coated spheres are added, the spheres remain dispersed in the continuous phase of the emulsion and do not become a part of the dispersed elastomer particles. As the emulsion is dried, the dispersed elastomer particles and the dispersed metal-coated particles are brought closer and closer together. In the dried film, it is believed that the metal-coated spheres are found in random contact with each other with the crosslinked elastomer particles occupying the space between them. The crosslinked elastomer particles are bound to each other through a solid continuous polar phase resulting from the colloidal silica, alkali metal silicate or organosilicate. The result of this unique morphology of the dried product is an unusually efficient use of the metal-coated spheres to establish electrical conductivity in the product. The amount of the metal-coated spheres required to reach a surface resistivity of 2 ohms per square is much less than that required when other types of emulsions are used, as is shown in Example 3.

The emulsion, (A), is an aqueous emulsion having a dispersed phase of elastomer and a continuous phase of water containing a material selected from the group comprising colloidal silica, alkali metal silicates and organosilicates which, upon removal of the water, yields an elastic product comprising dispersed particles of elastomer in a solid polar continuous phase.

Preferred emulsions for (A) are silicone emulsions, that is, emulsions in which the elastomer is based upon polydiorganosiloxane. A silicone emulsion having a dispersed phase of an anionically stabilized hydroxylated polydiorganosiloxane and a colloidal silica and a continuous phase of water in which the pH is 9 to 11.5 as described in U.S. Pat. No. 4,221,688, issued Sept. 9, 1980, to Johnson et al. is a preferred emulsion for use in this invention as (A). U.S. Pat. No. 4,221,688 is hereby incorporated by reference to disclose the emulsion and method of manufacture of such an emulsion. Hydroxylated polydiorganosiloxanes are those which impart elastomeric property to the product obtained after removal of the water from the emulsion. They should have a weight average molecular weight of at least 5,000, preferably in a range of 200,000 to 700,000. The organic radicals of the hydroxylated polydiorganosiloxane can be monovalent hydrocarbon radicals containing less than seven carbon atoms per radical and 2-(perfluoroalkyl)ethyl radicals containing less than seven carbon atoms per radical. The hydroxylated polydiorganosiloxanes preferrably contain at least 50 percent methyl radicals with polydimethylsiloxane being preferred. The hydroxylated polydiorganosiloxanes are preferably those which contain about 2 silicon-bonded hydroxyl radicals per molecule.

The most preferred hydroxylated polydiorganosiloxanes are those prepared by the method of anionic emulsion polymerization described by Findley et al. in the U.S. Pat. No. 3,294,725 which is hereby incorporated by reference to show the methods of polymerization and to show the hydroxylated polydiorganosiloxane in emulsion. Another method of preparing hydroxylated polydiorganosiloxane is described by Hyde et al. in U.S. Pat. No. 2,891,920 which is hereby incorporated by reference to show the hydroxylated polydiorganosiloxanes and their method of preparation.

The emulsion of U.S. Pat. No. 4,221,688, cited above, requires colloidal silica as an ingredient. Any of the colloidal silicas can be used, the preferred colloidal silicas are those which are available in an aqueous medium. Aqueous colloidal silicas which have been stabilized with sodium ion are particularly useful because the pH requirement can be met by using such a sodium stabilized colloidal silica without having to add additional ingredients to bring the pH within the 9 to 11.5 range. The preferred amount of colloidal silica is from 1 to 25 parts by weight for each 100 parts by weight of polydiorganosiloxane.

The emulsion of U.S. Pat. No. 4,221,688 cited above makes use of an organic tin compound, preferably a diorganotindicarboxylate to reduce the storage time between the preparation of the emulsion and the time an elastomeric product can be obtained from the silicone emulsion by removal of the water under ambient conditions to an acceptable range of one to three days. The diorganotindicarboxylate can be used in amounts of from 0.1 to 2 parts by weight for each 100 parts by weight of the polydimethylsiloxane. The preferred diorganotindicarboxylate is dioctyltindilaurate.

The emulsion of U.S. Pat. No. 4,221,688 cited above is prepared by a method consisting essentially of emulsifying a hydroxylated polydiorganosiloxane which contains about 2 silicon-bonded hydroxyl radicals per molecule using an anionic surfactant and water, adding a colloidal silica and an organic tin compound and adjusting the pH of the resulting emulsion to a range from 9 to 11.5 inclusive.

Another emulsion useful as (A) of this invention is described in U.S. Pat. No. 4,244,849 issued Jan. 13, 1981, to Saam, hereby incorporated by reference to disclose the emulsion and method of manufacture of such an emulsion. This emulsion comprises a continuous water phase and an anionically stabilized dispersed silicone phase which is a graft copolymer of a hydroxyl endblocked polydiorganosiloxane and an alkali metal silicate which is present in the continuous water phase. The emulsion has a pH within the range from 8.5 to 12 inclusive. The hydroxyl endblocked polydiorgano- siloxane useful in this embodiment is the same as that described above. The alkali metal silicates that are suitable are water soluble silicates, preferably employed as an aqueous solution. Preferred is sodium silicate in an amount of from 0.3 to 30 parts by weight for each 100 parts by weight of polydiorganosiloxane. During the preparation of the emulsion an organic tin salt is added to catalyze the reaction of the hydroxyl endblocked polydiorgano- siloxane and the alkali metal silicate. A diorganotindicarboxylate is a preferred organic tin salt with from 0.1 to 2 parts by weight employed for each 100 parts by weight of polydiorganosiloxane. The preferred diorganotindicarboxylate is dioctyltindilaurate.

These emulsions are preferably prepared by mixing together an anionically stabilized aqueous emulsion of hydroxyl endblocked polydiorganosiloxane, aqueous solution of alkali metal silicate, and organic tin salt in an emulsion so that all the ingredients are initially present as dispersed particles in water. The pH of the emulsion is adjusted to a range of from 8.5 to 12 inclusive if necessary. Upon aging, the silicate and polydiorganosiloxane form a graft copolymer of dispersed particles in which the polydiorganosiloxane becomes crosslinked. If the emulsion is dried, an elastomer is formed.

Another emulsion useful as (A) of this invention is described in U.S. Pat. No. 4,248,751 issued Feb. 3, 1981 to Willing, hereby incorporated by reference to disclose the emulsion and its method of manufacture. For use in this invention, the emulsion includes the addition of colloidal silica. This emulsion is the emulsion produced by a process comprising emulsifying (C) a vinyl endblocked polydiorganosiloxane and (D) an organosilicon compound having silicon-bonded hydrogen atoms using water and surfactant to form an emulsion, adding a platinum catalyst and heating the emulsion to form a dispersed phase of crosslinked silicone elastomer, then adding colloidal silica. The vinyl endblocked polydiorganosiloxane (C) preferably is a polydiorganosiloxane terminated by triorganosiloxy groups and having two vinyl radicals per molecule, no silicon atom having more than one vinyl radical bonded thereto. The remaining organic radicals are preferably those with six carbon atoms or less with the preferred organic radicals being selected from the group consisting of methyl, ethyl, phenyl, and 3,3,3-trifluoropropyl radicals, at least 50 percent of the radicals being methyl radicals. The polydiorganosiloxane should have a viscosity of from 0.1 to 100 Pa's at 25° C.

In this embodiment, the organosilicon compound, (D), can be any compound or combination of compounds containing silicon-bonded hydrogen atoms useful as crosslinkers and providing an average of silicon-bonded hydrogen atoms per molecule of (D) of at least 2.1. Such compounds are known in the art as illustrated in U.S. Pat. No. 3,697,473, issued Oct. 10, 1972 to Polmanteer et al., which is hereby incorporated by reference to show such organosilicon compounds. A preferred organo-silicon compound is a mixture which consists essentially of (1) an organosiloxane compound containing two silicon-bonded hydrogen atoms per molecule and the organic radicals being selected from the group consisting of alkyl radicals having from 1 to 12 carbon atoms inclusive, phenyl, and 3,3,3-trifluoropropyl radicals, no silicon atom having bonded thereto more than one silicon-bonded hydrogen atom, and said organosiloxane (1) having no more than 500 silicon atoms per molecule, and (2) an organosiloxane compound containing at least 3 silicon-bonded hydrogen atoms per molecule, the organic radicals being selected from the group defined above for R', no silicon atom having bonded thereto more than one silicon-bonded hydrogen atom and said organosiloxane compound (2) having no more than 75 silicon atoms per molecule. This mixture is such that at least 10 percent of the silicon-bonded hydrogen atoms are derived from (1) or (2) and the combination of (1) and (2) provides 100 weight percent of the mixture. For use in the instant invention, organosiloxane compound (2) can have as many silicon-bonded hydrogen atoms per molecule as there are silicon atoms per molecule. The organosilicon compound is preferably added in an amount such that there are present from 0.75 to 1.50 silicon- bonded hydrogen atoms in the compound (D) for each vinyl radical in the vinyl endblocked polydiorganosiloxane (C).

The emulsion of this embodiment is produced by emulsifying polydiorganosiloxane (C) and organosiloxane compound (D) in water and a surfactant as shown in U.S. Pat. No. 4,248,751, cited above. After the emulsion of (C) and (D) has been made, a platinum catalyst is added. The emulsion is then heated to form a dispersed phase of crosslinked silicone elastomer as the ingredients (C) and (D) react in the presence of the platinum catalyst. After the crosslinked polymer is formed, colloidal silica is added to the emulsion, preferably in the form of an aqueous dispersion of a colloidal silica. The amount of colloidal silica is not critical, up to 70 parts by weight can be added with about 25 parts by weight of silica per 100 parts by weight of elastomer being preferred. If the emulsion is dried, the product is a dispersed phase of crosslinked elastomer in a solid polar continuous phase formed by the colloidal silica.

Another emulsion useful in (A) of this invention is described in U.S. Pat. No. 4,273,634 issued June 16, 1981, to Saam et al. which is hereby incorporated by reference to show the emulsion and method of manufacture of an emulsion useful in this invention when colloidal silica is also present in the emulsion. The emulsion of this embodiment comprises an emulsion prepared by (E) first forming a stabilized dispersion of hydroxyl endblocked polydiorganosiloxane containing sufficient vinyl substituted siloxane units to facilitate the crosslinking of the polydiorganosiloxane and having a weight average molecular weight of at least 5000. The preferred weight average molecular weight is in the range of from 200,000 to 700,000. The organic radicals of the hydroxyl endblocked polydiorganosiloxane can be monovalent hydrocarbon radicals containing less than seven carbon atoms per radical and 2-(perfluoroalkyl)ethyl radicals containing less than seven carbon atoms per radical. It is preferred that at least 50 percent of the radicals are methyl radicals with a preferred polydiorganosiloxane being a copolymer containing dimethylsiloxane units and methylvinylsiloxane units. The amount of vinyl-substituted siloxane units is not critical, typically about 0.03 to 0.06 mole percent of the vinyl-substituted siloxane units are preferred.

A preferred method of forming the stabilized dispersion is to prepare the polydiorganosiloxane by emulsion polymerization, preferably by the method of U.S. Pat. No. 3,294,725 cited above.

After the dispersion of hydroxyl endblocked polydiorganosiloxane containing vinyl substituted siloxane units has been made, it is treated to provide a crosslinking action by forming radicals within the dispersed polydiorganosiloxane. Any of the methods known in the art to produce radicals that will crosslink the polydiorganosiloxane can be employed in the present invention as long as the radicals can be generated within the dispersed particles without breaking or coagulating the dispersion. Generally, crosslink-inducing radicals can be produced by energy activation of the polydiorganosiloxane directly or by energy activation of radical-producing agents dissolved in the droplets.

A method of producing radicals by energy activation of the dispersed polydiorganosiloxane directly is to expose the dispersion to high energy radiation as by exposure to gamma radiation until crosslinking takes place. Another method is by energy activation of a radical-producing agent which is dissolved in the silicone particles of the dispersion. A preferred radical producing agent includes any of the well-known organic peroxides which are suitable for vulcanizing silicone rubber. The radical-producing agent is dissolved in the emulsion and then the emulsion is heated to the elevated temperature at which the agent produces radicals so that the polydiorganosiloxane is crosslinked.

After the polydiorganosiloxane in the emulsion is crosslinked, colloidal silica is added to the emulsion, preferably in the form of an aqueous dispersion of colloidal silica. The amount of colloidal silica is not critical, up to 70 parts by weight can be added with a preferred amount from about 10 to 25 parts by weight of colloidal silica per 100 parts by weight of polydiorganosiloxane.

Another emulsion, (A), of this invention is described in the patent application Ser. No. 624,545, titled "Polydiorganosiloxane Latex", by Huebner and Saam, filed on June 26, 1984 and having the same assignee as this application, which is hereby incorporated by reference to describe the emulsion and it's method of manufacture. In this method of producing an aqueous emulsion of crosslinked polydiorganosiloxane, a hydroxyl endblocked polydiorganosiloxane is mixed with a hydrolyzable silane having 3 or 4 hydrolyzable groups, a surface active anionic catalyst selected from the group consisting of a compound of the formula $R'C_6H_4SO_3H$ wherein $R'$ is a monovalent aliphatic hydrocarbon radical of at least 6 carbon atoms and a compound of the formula $R'OSO_2OH$ wherein $R'$ is as defined above, and sufficient water to form an oil-in-water emulsion. The mixture is immediately homogenized, then allowed to polymerize at a temperature of from about 15 to 30° C. for at least 5 hours at a pH of less than 5 until a crosslinked polymer is formed. The crosslinked polymer emulsion is then neutralized to a pH of greater than 7 and reinforced by adding greater than 1 part by weight of colloidal silica sol or silsesquioxane.

The composition of this invention is prepared by mixing the emulsion (A) with the metal-coated spheres (B). Because of the fluidity of the emulsion (A), it is a simple matter to stir in the metal-coated spheres. At least 100 parts by weight of the metal-coated spheres is necessary in order to obtain the desired degree of electrical conductivity when the metal comprises 12 percent by weight of the spheres. Preferably, the spheres are from 5 to 20 percent metal based on their total weight. The preferred amount of metal-coated spheres is in the range of from 100 to 180 parts by weight per 100 parts by weight of non-volatile material in (A). In this application, the non-volatile content of (A) is defined as the amount of material remaining when a 2 gram sample is placed in an aluminum drying cup and heated for one hour at 150° C. in an air circulating oven. The percent non-volatile material measured in this manner approximates the amount of non-volatile material obtained upon drying at ambient conditions for 7 days. For a given weight of metal-coated spheres, the electrical conductivity is related to the average diameter of the spheres with spheres of larger diameter giving a more conductive product, therefore the larger end of the useable range of diameter is preferred. Because of the ease with which the metal-coated spheres can be mixed with emulsion (A) there is little damage to the metal coating. This may not be the case when a material such as a high viscosity silicone rubber is mixed with metal-coated spheres to produce an electrically conductive rubber. For example, the same weight of metal-coated spheres as was mixed into the emulsion of this invention was mixed into a silicone one-part sealant and into a high consistency silicone rubber stock; the electrical conductivity of the elastic product produced from the emulsion was 100 times greater than that produced from the silicone rubber, while the product produced from the sealant was non-conductive. When the emulsion (A) of this invention is strongly alkaline, as is present in some embodiments, the electrically conductive metal-coated spheres must be chosen with this fact in mind and only metals which will remain electrically conductive in the alkaline environment are chosen to coat the spheres.

Coatings produced from the composition of this invention have been found to be particularly effective as shielding for stopping electromagnetic interferences at radio and television frequencies. The enclosure for an apparatus generating electromagnetic interferences or the enclosure of an apparatus which is sensitive to electromagnetic interferences may be coated with the emulsion of this invention. The coating is dried to yield a continuous film having adhesion to the substrate and an electrical resistivity of less than 2 ohms per square. Tests have shown the elastic product comprising particles of crosslinked elastomer dispersed in the solid polar continuous phase with the electrically conductive spheres being dispersed in the continuous phase is a very good electromagnetic shield. When tested at radio and television frequencies, greater than 99.9999 percent of the transmitted energy was stopped by the coating.

Because emulsion (A) of this invention allows simple mixing with the metal-coated spheres (B), a homogeneous mixture is easily produced. The viscosity and flow characteristics of the mixture can be regulated by adjusting the solids content and by the addition of flow control agents and thixotropy agents such as the sodium salts of polyacrylates. Thixotropic mixtures have sufficient viscosity so that the metal-coated spheres do not settle out during the drying of the film, but the mixture can also be sprayed for ease in application. The inherent thermal resistance, excellent weatherability, and chemical inertness of the emulsion used in this invention gives the electrically conductive elastic product of this invention these same desirable properties in addition to its electrical conductivity.

The following examples are presented for purposes of illustrating the invention and should not be construed as limiting the scope of the invention which is properly delineated in the claims.

EXAMPLE 1

An experiment was conducted to determine the electrical conductivity of films produced from electrically conductive spherical particles dispersed in an aqueous emulsion.

An anionically stabilized, emulsion polymerized polydimethylsiloxane was prepared by homogenizing hydroxyl endblocked polydimethylsiloxane fluid, water, and sodium lauryl sulfate surfactant, then adding dodecylbenzene sulfonic acid to polymerize the fluid in the emulsion. After polymerization the emulsion was treated with diethylamine. The finished emulsion was about 58 percent by weight of hydroxyl endblocked polydimethylsiloxane having a weight average molecular weight of about 325,000, with a pH in the range of 9.5 to 10.5.

This emulsion of polydimethylsiloxane was converted to an emulsion having a dispersed phase of crosslinked elastomer by mixing 2510 g of the emulsion, 1005 g of a 15 per cent by weight dispersion of colloidal silica, and 30 g of a 50 percent solids dispersion of dioctyltindilaurate. The mixture was in the ratio of 100 parts by weight polymer, 10 parts by weight silica, and 1 part by weight tin salt. The mixture contained about 45% of non-volatile material per 100 g of the mixture. The mixture was aged for greater than 3 days at room temperature to allow the ingredients to react. A sample of the emulsion dried to an elastomeric film.

A series of mixtures were prepared by mixing 0.5 g of silver-coated glass spheres of about 25 micrometers diameter and having about 12 percent of their total weight as silver with the amounts of the above crosslinked emulsion shown in Table I. Samples of each mixture were then poured onto glass microscope slides to form a film and the film was allowed to dry. The dried films were elastomeric. The electrical conductivity of the dried films was measured by placing the probes of an ohm meter on the surface of each film with a distance of one centimeter between the probes. The resistance of each film is shown in Table I.

The results show that the dried films are electrically conductive with the conductivity becoming significant when 125 parts or more of the silver-coated glass sphere are used per 100 parts of crosslinked elastomer.

TABLE 1

| Crosslinked Emulsion grams | Silver-Coated Glass per 100 g of Elastomer grams | Resistance ohms |
|---|---|---|
| 1.77 | 60 | $6.5 \times 10^5$ |
| 1.27 | 83.5 | $4.2 \times 10^5$ |
| 0.85 | 125 | $1.3 \times 10^0$ |
| 0.44 | 250 | $2.5 \times 10^{-1}$ |
| 0.32 | 333 | $2.0 \times 10^{-1}$ |
| 0.21 | 500 | $1.5 \times 10^{-1}$ |

EXAMPLE 2

A series of samples were prepared to compare the properties of films made from an elastomeric emulsion, a silicone rubber, and a room temperature curing silicone sealant, each containing metal-coated glass spheres.

A crosslinked elastomer emulsion was prepared by mixing 172 parts by weight of the anionically stabilized, emulsion polymerized polydimethylsiloxane of Example 1, 100 parts by weight of the colloidal silica dispersion of Example 1, 0.2 part by weight of the dispersion of dioctyltindilaurate, 2 parts by weight of diethylamine, and 9.6 parts by weight of an acrylic thickening agent having 30 percent by weight solids. The emulsion had a pH of about 10.5, a viscosity of about 50 Pa·s at 25° C., and a non-volatile content of about 42 percent by weight. A sample of the emulsion when dried had the properties shown in Table II.

Portions of the above emulsion were mixed with the parts by weight of silver-coated glass spheres of Example 1 shown in Table II for each 100 parts by weight of non-volatile material in the mixture. Films of each sample were cast in containers to a thickness of from 0.5 to 1.3 millimetres and dried. The electrical conductivity was measured by pressing a pair of 1 cm long electrodes held 1 cm apart onto the surface of the cured films and measuring the resistance with an ohm meter. The results are shown in Table II. The films were cut into physical test pieces and physical properties measured according to ASTM E412 for tensile strength, elongation at break and initial tensile modulus. The results are shown in Table II.

The silicone rubber samples were prepared by milling the parts by weight of silver-coated glass spheres shown in Table II into a commercial silicone rubber base containing 100 parts by weight of polydimethylsiloxane gum, 23 parts by weight of fumed silica reinforcement and 0.5 part by weight of organic peroxide catalyst. The samples were then molded into a sheet in a press and cured for 10 minutes at 165° C. The cured samples were tested as above with the results shown in Table II.

The sealant sample was prepared by milling 150 parts by weight of the silver-coated glass spheres into 100 parts by weight of a commercial room temperature curing silicone sealant that cured through exposure to moisture, giving off acetic acid as a byproduct. The sample was formed into a sheet. After allowing the sample to cure, the properties were measured with the results shown in Table II.

A comparison of the three types of filled elastomers at the 150 parts by weight of silver-coated glass spheres level shows that the film produced from the emulsion is much more electrically conductive than that produced by the silicone rubber or the silicone sealant. A comparison of the physical properties shows that the tensile strength of the film produced from the emulsion is higher than that produced from the sealant, but lower than that produced from the rubber. The elongation figures show that all the samples have appreciable tensile elongation at break.

TABLE II

| Elastomer | Silver-Coated Glass Spheres Parts by Weight | Resistivity ohms per square | Tensile Strength MPa | Elongation percent |
|---|---|---|---|---|
| Emulsion | none | — | 2.96 | 520 |
|  | 50 | n.c. | 1.96 | 130 |
|  | 100 | n.c. | 1.50 | 22 |
|  | 150 | 0.4 | 1.39 | 24 |
| Rubber | none | — | 5.48 | 844 |
|  | 50 | n.c. | 2.94 | 586 |
|  | 100 | n.c. | 2.64 | 578 |
|  | 150 | 50 | 2.16 | 570 |
| Sealant | none | — | 1.54 | 510 |
|  | 150 | n.c. | 0.85 | 175 | n.c. - value of greater than $10^7$

EXAMPLE 3

A comparison was made of electrically conductive films from emulsions containing the mixture of this invention with a styrene-butadiene rubber emulsion and an acrylic emulsion.

The emulsion of this invention was prepared by mixing 5.40 g of the silver-coated glass spheres of Example 1 into 10.0 g of the crosslinked elastomer emulsion of Example 2. This gave 118 parts by weight of silver-coated glass spheres per 100 parts by weight of emulsion solids.

A styrene-butadiene emulsion sample was prepared by mixing 5.91 g of the silver-coated glass spheres into 10 g of a commercial emulsion having 50 percent by weight solids. (Dow Chemical Company 223 Latex) The polymer particles are not crosslinked. This gave 118 parts by weight of silver-coated glass spheres per 100 parts by weight of emulsion solids.

An acrylic emulsion sample was prepared by mixing 4.49 g of the silver-coated glass spheres into 10 g of a commercial emulsion having 38 percent by weight solids (Rohm and Haas Company acrylic emulsion W5-68). The polymer particles are not crosslinked. This gave 118 parts by weight of silver-coated glass spheres per 100 parts by weight of emulsion solids.

Films of each emulsion were prepared by pouring sufficient emulsion into a container to yield a dried film of about 1 mm thickness and allowing the films to dry. After they were completely dried, the films were removed from the containers and the electrical conductivity of the top surface and the bottom surface of each film was measured as in Example 2. The results in Table III show that the emulsion of this invention is more conductive than either of the organic emulsions even though all three emulsions have the same concentration of conductive silver-coated glass spheres present.

TABLE III

| Emulsion | Resistivity ohms per square | |
|---|---|---|
| | Top | Bottom |
| Silicone | 0.2 | 0.2 |
| Styrene-Butadiene | $1.4 \times 10^7$ | $5.9 \times 10^6$ |
| Acrylic | 4.4 | 2.2 |

EXAMPLE 4

A sample of an emulsion of this invention was tested as a shielding material for preventing radiation from electrical devices.

A film was cast as in Example 2 using 180 parts by weight of the silver-coated glass spheres of Example 2 for each 100 parts by weight of crosslinked elastomer emulsion solids. The surface resistivity of the sample measured as in Example 2 was 0.2 ohms per square. A test specimen was cut from the film and installed in a coaxial transmission line set up to measure the shielding effectiveness of samples by determining the amount of energy shunted by the sample from the inner conductor of the coaxial cable to the outer conductor. Tests were performed at different frequencies and the decibels of energy shunted were measured. Shielding valves of 30 to 40 decibels are considered in the art to be average with a valve of 70 decibels considered to be 99.99999 percent effective. The volume resistivity of the film in place in the test device was measured as 0.00 ohm-cm. The shielding effectiveness of the sample was measured as shown in Table IV. The film was an outstandingly effective shield for electromagnetic radiation in the range of from 0.5 to 1000 megaHertz, the range of radio and television transmission.

TABLE IV

| Test Frequency megaHertz | Shielding Effectiveness decibels |
|---|---|
| 0.5 | 67 |
| 1.5 | 66 |
| 5 | 66 |
| 15 | 68 |
| 50 | 70 |
| 250 | 65 |
| 500 | 63 |
| 1000 | 61 |

EXAMPLE 5

Different types of emulsions having crosslinked elastomer present as the dispersed phase were evaluated.

A first emulsion was an emulsion that was crosslinked by the addition of colloidal silica as in Example 1. The emulsion was made electrically conductive by adding 145 parts by weight of the silver-coated glass spheres of Example 1 per 100 parts by weight of non-volatile material in the emulsion.

A second emulsion was an emulsion that was crosslinked by the addition of sodium silicate. The anionically stabilized, emulsion polymerized polydimethylsiloxane of Example 1 in an amount of 3000 g was mixed with 229.3 g of a 39 percent by weight solids solution of sodium silicate having about 8 percent sodium as $Na_2O$. This yielded 5 parts by weight of sodium silicate per 100 parts by weight of polydimethylsiloxane. Then 39.6 g of the dioctyltindilaurate dispersion of Example 1 was added to yield about 1 part by weight of dioctyltindilaurate by weight per 100 parts by weight of polydimethylsiloxane. The mixture had a pH of about 10.8. It was stirred for 24 hours, then stored for 3 days to allow the polymer to crosslink so that an elastomeric product was formed upon removal of the water under ambient conditions. Then 10 g of the aged emulsion were stirred together with 8.53 g of the silver-coated glass spheres of Example 1, giving a ratio of 145 parts by weight of silver-coated glass spheres per 100 parts by weight of non-volatile material in the aged emulsion.

A third emulsion was an emulsion that was crosslinked by the reaction between hydroxyl endblocked polydimethylsiloxane fluid and ethylorthosilicate. A first mixture of 850 g of hydroxyl endblocked polydimethylsiloxane fluid and 38.3 g of ethylorthosilicate was prepared by simple mixing. This first mixture was then added to a second mixture of 19.5 g of dodecylbenzene sulfonic acid in 850 g of water. The resulting mixture was thoroughly shaken to insure a homogenous mixture, then given 2 passes through a homogenizer set at 54 MPa. The emulsion was then held at 21° C. for 24 hours to allow for the reaction between the polymer and the ethylorthosilicate to produce crosslinked particles dispersed in the emulsion. After the particles had crosslinked, the emulsion was treated with a 3 percent solution of sodium hydroxide to a pH of about 8.5 to 9.

Next 377 g of the above emulsion was mixed with 128.5 g of an acidic emulsion of colloidal silica. This colloidal silica emulsion had a pH of about 3.2 and 34 percent by weight solids content of colloidal silica having a particle size of about 20 nanometers and a surface area of about 150 $m^2/g$. The pH was then about 7.8. A film cast of this emulsion had a tensile strength of about 1.58 MPa and an elongation at break of 210 percent. The emulsion was then mixed with 0.1 N hydrochloric acid solution to adjust the pH to 6.8.

Then 10 g of the acidified emulsion was mixed by stirring with 6.28 g of the silver-coated glass spheres of Example 1, giving a ratio of 145 parts by weight of silver-coated glass spheres per 100 parts by weight of non-volatile material in the acidified emulsion.

Each of the emulsions was cast into a film and allowed to dry. After curing, the electrical conductivity of the top and bottom of each film was measured as in Example 2 with the results as shown in Table V. A comparison of the conductivity on the top and bottom surfaces shows that the uniformity of the distribution of the silver-coated glass spheres varies with the emulsion used. The distribution of the spheres in the emulsion is determined by the viscosity of the emulsion when it is formed into a film. The higher the viscosity, the less settling of the spheres during the drying period.

TABLE V

| Emulsion | Resistivity ohms per square | |
|---|---|---|
| | Top | Bottom |
| 1 | 0.46 | 0.22 |
| 2 | 145 | 0.83 |
| 3 | 0.13 | 0.13 |

That which is claimed is:

1. A silicone composition which provides an elastomeric electrically conductive product upon removal of water under ambient conditions comprising
   (A) an emulsion of a dispersed phase of silicone elastomer, and a continuous phase of water containing a material selected from the group comprising colloidal silica, alkali metal silicates, and organosilicates, said emulsion being an aqueous oil-in-water emulsion, having at least 20 percent by weight water, that cures upon drying at ambient temperature to an elastomeric film, and
   (B) from 100 to 500 parts by weight of electrically conductive, metal coated spheres having a diameter of from 5 to 105 micrometers and less than 20 percent of their total weight as metal, said metal being selected from the group consisting of gold, silver, platinum, palladium, and nickel, based upon 100 parts by weight of non-volatile material in (A),
   the composition, upon removal of the water, yielding an elastomeric product having dispersed particles of elastomer and electrically conductive spheres in a solid polar continuous phase, and having a surface resistivity of less than 2 ohms per square on at least one surface.

2. The aqueous emulsion of claim 1 in which the metal coated spheres are present in an amount of from 100 to 180 parts by weight.

3. The aqueous emulsion of claim 2 in which the metal coated spheres are glass spheres coated with silver and having from 5 to 20 percent of their total weight present as silver.

4. The composition of claim 1 in which the emulsion (A) is a silicone emulsion suitable to provide an elastomeric product upon removal of the water under ambient conditions comprising a continuous aqueous phase and a dispersed phase, the dispersed phase consisting essentially of an anionically stabilized hydroxylated polydiorganosiloxane which contains about 2 silicon-bonded hydroxyl radicals per molecule, an organic tin compound, and a colloidal silica, said silicone emulsion having a pH in a range of 9 to 11.5 inclusive.

5. The aqueous emulsion of claim 4 in which the polydiorganosiloxane is a polydimethylsiloxane having a weight average molecular weight in a range of 200,000 to 700,000, the colloidal silica is present in a amount of from 1 to 25 parts by weight for each 100 parts by weight of polydimethylsiloxane, and the organic tin compound is a diorganotindicarboxylate present in an amount of from 0.1 to 2 parts by weight for each 100 parts by weight of the polydimethylsiloxane.

6. The aqueous emulsion of claim 5 in which the metal coated spheres are present in an amount of from 100 to 180 parts by weight per 100 parts by weight of crosslinked elastomer, the metal coated spheres being glass spheres coated with silver and having from 5 to 20 percent of their total weight as silver.

7. The composition of claim 1 in which the elastomer of emulsion (A) comprises a graft copolymer of hydroxyl endblocked polydiorganosiloxane and an alkali metal silicate, the silicone emulsion having a pH within the range from 8.5 to 12 inclusive.

8. The composition of claim 7 in which the hydroxyl endblocked polydiorganosiloxane is a polydimethylsiloxane having an average molecular weight in a range of 200,000 to 700,000, the alkali metal silicate is a sodium silicate employed in an amount of from 0.3 to 30 parts by weight for each 100 parts by weight of polydimethylsiloxane, and there is also present an organic tin salt.

9. The composition of claim 8 in which the organic tin salt is a diorganotindicarboxylate present in an amount of from 0.1 to 2 parts by weight for each 100 parts by weight of polydimethylsiloxane.

10. The composition of claim 1 in which the emulsion (A) comprises the emulsion produced by a process comprising emulsifying (C) a vinyl endblocked polydiorganosiloxane and (D) an organosilicon compound having silicon-bonded hydrogen atoms using water and surfactant to form an emulsion, adding a platinum catalyst and heating the emulsion to form a dispersed phase of cross-linked silicone elastomer, then adding colloidal silica.

11. The composition of claim 10 in which the vinyl endblocked polydiorganosiloxane (C) is a polydiorganosiloxane terminated by triorganosiloxy groups and having two vinyl radicals per molecule, no silicon atom having more than one vinyl radical bonded thereto, the remaining organic radicals being selected from the group consisting of methyl, ethyl, phenyl, and 3,3,3-trifluoropropyl radicals, at least 50 percent of the organic radicals being methyl radicals, and said polydiorganosiloxane having a viscosity of from 0.1 to 100 Pa·s at 25° C., and the organo-silicon compound (D) is a mixture of silicon compounds providing from 0.75 to 1.50 silicon-bonded hydrogen atoms per vinyl radical of (C), said mixture (D) consisting essentially of
    () an organosiloxane compound containing two silicon-bonded hydrogen atoms per molecule and the organic radicals being selected from the group consisting of alkyl radicals having from 1 to 12 carbon atoms inclusive, phenyl and 3,3,3-trifluoropropyl, no silicon atom having bonded thereto more than one silicon-bonded hydrogen atom, and said organosiloxane compound (1) having no more than 500 silicon atoms per molecule, and
    (2) an organosiloxane compound containing at least 3 silicon-bonded hydrogen atoms per molecule, the organic radicals being selected from the group consisting of alkyl radicals having from 1 to 12 carbon atoms inclusive, phenyl and 3,3,3-trifluoropropyl radicals, no silicon atom having bonded thereto more than one silicon-bonded hydrogen atom, and said organosiloxane compound (2) having no more than 75 silicone atoms per molecule, said mixture (D) being such that at least 10 percent of the silicon-bonded hydrogen atoms are derived from (1) and at least 10 percent of the silicon-bonded hydrogen atoms are derived from (2), (1) and (2) composing 100 weight percent of mixture (D).

12. The composition of claim 1 in which the emulsion (A) comprises an emulsion prepared by (E) first forming a stabilized dispersion of hydroxyl endblocked polyorganosiloxane containing sufficient vinyl substituted siloxane units to facilitate the crosslinking of the polydiorganosiloxane and having a weight average molecular weight of at least 5000 and then, (F) treating the dispersion to provide a crosslinking action by forming radicals within the dispersed polydiorganosiloxane, then adding colloidal silica.

13. The composition of claim 12 in which the radicals are formed within the dispersed polydiorganosiloxane by exposing the dispersion to high energy radiation.

14. The composition of claim 12 in which the radicals are formed within the dispersed polydiorganosiloxane by the combined action of heat and a radical-producing agent.

15. The composition of claim 12 in which the polydiorganosiloxane is a copolymer containing dimethylsiloxane units and methylvinylsiloxane units, the copolymer having a weight average molecular weight of 200,000 to 700,000.

16. The elastomeric, electrically conductive product produced by drying the composition of claim 1.

17. The elastomeric, electrically conductive product produced by drying the composition of claim 3.

18. The elastomeric, electrically conductive product produced by drying the composition of claim 4.

19. The elastomeric, electrically conductive product produced by drying the composition of claim 7.

20. The elastomeric, electrically conductive product produced by drying the composition of claim 10.

21. The elastomeric, electrically conductive product produced by drying the composition of claim 12.

* * * * *